United States Patent
Matzinger et al.

(10) Patent No.: US 8,124,670 B2
(45) Date of Patent: Feb. 28, 2012

(54) WATER-SOLUBLE AND BIODEGRADABLE COPOLYMERS ON A POLYAMIDE BASIS AND USE THEREOF

(75) Inventors: Martin Matzinger, Trostberg (DE); Roland Reichenbach-Klinke, Taunstein (DE); Gregor Keilhofer, Tacherting (DE); Johann Plank, Trostberg (DE); Christian Spindler, Ludwigshafen (DE)

(73) Assignee: BASF Construction Polymers GmbH, Trostberg (DE)

( * ) Notice: Subject to any disclaimer, the term of this patent is extended or adjusted under 35 U.S.C. 154(b) by 92 days.

(21) Appl. No.: 12/376,297

(22) PCT Filed: Aug. 9, 2007

(86) PCT No.: PCT/EP2007/058271
§ 371 (c)(1),
(2), (4) Date: Sep. 22, 2009

(87) PCT Pub. No.: WO2008/019987
PCT Pub. Date: Feb. 21, 2008

(65) Prior Publication Data
US 2010/0240802 A1   Sep. 23, 2010

(30) Foreign Application Priority Data

Aug. 18, 2006 (DE) .................. 10 2006 038 809

(51) Int. Cl.
*C09K 8/00* (2006.01)
(52) U.S. Cl. ...................................................... 523/130
(58) Field of Classification Search .................. 523/130
See application file for complete search history.

(56) References Cited

U.S. PATENT DOCUMENTS

| | | | | |
|---|---|---|---|---|
| 3,936,408 A | * | 2/1976 | Adams et al. | 523/130 |
| 4,547,298 A | * | 10/1985 | Novak | 507/118 |
| 6,681,856 B1 | * | 1/2004 | Chatterji et al. | 166/294 |
| 2004/0099416 A1 | * | 5/2004 | Vijn et al. | 166/292 |

FOREIGN PATENT DOCUMENTS

| | | |
|---|---|---|
| CN | 1407951 A | 4/2003 |
| DE | 199 21 904 A1 | 11/2000 |
| EP | 0 194 889 A | 9/1986 |
| GB | 2 422 839 A | 8/2006 |

* cited by examiner

*Primary Examiner* — Mark Eashoo
*Assistant Examiner* — David Karst
(74) *Attorney, Agent, or Firm* — Fulbright & Jaworski L.L.P.

(57) ABSTRACT

Copolymers based on a polyamide containing at least one graft lateral chain consisting of ethylenic unsaturated compounds, in construction chemistry, as well as with the prospecting, exploiting and completion of oil-and gas deposits and with deep bore holes.

24 Claims, No Drawings

WATER-SOLUBLE AND BIODEGRADABLE COPOLYMERS ON A POLYAMIDE BASIS AND USE THEREOF

This application is a §371 of PCT/EP2007/058271 filed Aug. 9, 2007, which claims priority from DE 10 2006 038 809.7 filed Aug. 18, 2006.

The subject matter of the present invention is the novel use of polyamide-based copolymers.

Water-soluble polymers, produced by the polymerisation of ethylenic unsaturated monomers, are widely used as additives for applications in the field of construction chemistry and in the exploration, exploitation and completion of underground oil and gas deposits.

Known from U.S. Pat. No. 4,053,323 and U.S. Pat. No. 3,936,408 is the use of polyamide sulphonates as flow agents for hydraulic binding agents, in particular when cementing wells. Discussed in WO 03/085013 A1 are water-soluble copolymers based on olefinic sulphonic acids and the use thereof as water retention agents for aqueous building material systems containing mineral binding agents. Described in DE 102 29 837 A1 are polymeric water retention agents for drilling fluids and cement slurries based on vinyl-containing sulphonic acids. According to the U.S. Pat. No. 4,654,085, polyacrylamide is used together with cellulose and starch ethers as an additive for improving the stability of cement formulations. Furthermore, water-soluble copolymers based on acrylamido-alkylenesulphonic acid, N-vinylamides, acrylamide and vinylphosphonic acid are used to reduce water influx during the recovery of oil or gas (cf. WO 03/033860 A2). Known from EP 0 427 107 A2 is the use of a water-soluble copolymer consisting of ethylenic unsaturated sulphonic acids and acrylamides as a rheological additive for drilling fluids. A further field of use for water-soluble polymers produced by the polymerisation of ethylenic unsaturated monomers is the separation of oil from sand or rock masses containing mineral oil, as is discussed in EP 0 095 730 A2. The use of copolymers based on hydrolysed acrylamide and sulphonic acid derivatives as water retention agents in cement slurries is apparent from the U.S. Pat. No. 4,015,991.

Water retention agents are used to reduce or completely prevent the escape of water from slurries of organic or inorganic binding agents or pigments. The water loss is normally caused by capillary forces emanating from porous ground. Water retention agents may either bind water as a result of their chemical structure or may promote the formation of a thick filter cake on the ground. Water retention agents are used for this purpose as just described above for example in plasters, tile adhesives, joint mortars, fillers and self-levelling masses as well as in deep drilling slurries. Furthermore, they are also used inter alia in aqueous clay suspensions, which can be used, for example as drilling fluids. A number of compounds having such capabilities are known from the prior art. For example, EP-A 1 090 889 describes mixtures of clay and guar as water retention agents. DE-OS 195 43 304 and U.S. Pat. No. 5,372,642 disclose cellulose derivatives as water retention agents and EP-A 116 671, EP-A 483 638 and EP-A 653 547 describe synthetic polymers which contain acrylamido-substituted sulphonic acids as the comonomer.

All of these water-soluble polymers known from the prior art, which are produced by the polymerisation of ethylenic unsaturated monomers, are generally not biodegradable. These compounds can thus accumulate in the environment and contribute to the contamination of soil or water. This is particularly relevant if cement slurries come into contact, for example, with drinking water or agricultural areas. The use of water-soluble polymers in the exploration and production of crude oil or natural gas out at sea, i.e. in the so-called offshore zone, must in particular also be taken into consideration in this regard. These polymers are used here, for example, as water retention agents for cement systems in the construction of drilling platforms and in well cementing. In the first case, the polymers used may be washed out by sea water and in the latter case they may pass from the cement slurry into water-bearing formation layers. Therefore, in accordance with the "Convention for the Protection of the Marine Environment of the North-East Atlantic" (OSPAR Convention), preference should be given to biodegradable products in the case of use in a marine environment.

Biodegradable polymeric additives for cement slurries have already been individually cited in the prior art. For example, modified lignosulphonates are known as biodegradable flow agents from U.S. Pat. No. 6,019,835. The previously published US application 2002/0005287 describes polyaspartic acid as a biodegradable high-performance flow agent. Water-soluble, biodegradable polyamide-based copolymers and the use thereof are known from German laid-open document DE 103 14 354 A1. The copolymers described therein have at least one grafted side chain formed from aldehydes and sulphur-containing acids and optionally from at least one compound of the series of ketones, aromatic alcohols, urea derivatives and amino-s-triazines. Natural polyamides such as caseins, gelatines and collagens are cited as preferred polyamide components. The copolymers described herein are used in particular as flow agents or water retention agents for inorganic binding agents and pigments. The described water retention capability is predominantly due to synergistic modes of action of the described copolymers with modified polysaccharides.

U.S. Pat. No. 6,840,319 deals inter alia with compositions and biodegradable additives for the control of fluid loss when cementing subterranean formation zones. This additive is a condensation product of gelatine, formaldehyde, sodium sulphite and acetone, as well as a hydroxyethylcellulose substituted with ethylene oxide.

The subject matter of U.S. Pat. No. 6,681,856 is a method for cementing subterranean zones that uses biodegradable dispersants. The respective dispersants comprise a polyamide-based graft polymer containing at least one side chain formed from aldehyde and sulphur-containing acids or the salts thereof.

Although these water-soluble polymers are all biodegradable, they usually have the huge disadvantage, however, that they do not permit as large a variability of the chemical composition as the polymers formed from ethylenic unsaturated monomers, and their scope of use is therefore also very limited if there are, for example, changes in temperature or pressure and/or if there are fluctuations in the aqueous medium as regards the salt concentration. Since a number of different ethylenic unsaturated monomers, each with different functional groups, are available, an appropriate polymer can usually be "tailor-made" for many requirements by varying the monomers.

Graft gelatine polymers are known, in general, from the European patent application EP 0 015 880. According to this publication, the polymers are used in receiving elements and thereby serve in particular as dye mordants for photographic materials. The described graft polymers consist of at least three components, which are water-soluble proteinaceous polymers, a monomer which, when homopolymerised, yields a water-insoluble polymer and finally a monomer which comprises a sulphonate group and which, when homopolymerised, yields a water-soluble polymer. Gelatine is referred to as a typical representative of the water-soluble, proteinaceous polymers and acrylic monomers are mentioned as typical representatives of the monomers that yield a water-insoluble polymer.

The object forming the basis for the present invention was to introduce novel areas of use for polyamide-based copolymers containing at least one grafted side chain formed from ethylenic unsaturated compounds.

This object was solved by using these copolymers for applications in the field of construction chemistry as well as in the exploration, exploitation and completion of underground oil and natural gas deposits.

It was surprisingly found within the context of the present invention that these copolymers are not only suitable in general for applications in the field of construction chemistry, but are suitable in particular as water retention agents especially in the high-performance field. They generally have an only slightly pronounced retarding action and they exhibit their advantageous properties even under extreme conditions such as high temperatures, high pressures and high salt concentrations. This was not to be expected to this extent. Furthermore, it was found completely unexpectedly that depending on the composition of the grafted side chain, the known copolymers are also extremely suitable as a flow agent, a rheological additive, a retarding agent or a water influx regulator. In contrast to the previously known representatives, the copolymers according to the present invention are additionally biodegradable within their unexpectedly broad range of use.

For the reasons described above, the present invention includes a specific use wherein the polyamide-based copolymers are used as an additive for compositions containing hydraulic binding agents and in particular as a water retention agent. Also included is the use variant in the exploration, exploitation and completion of underground oil and gas deposits, in deep drilling and in tunnel construction. A use variant wherein the copolymers are used when cementing oil and gas wells, in particular in the off-shore zone, is to be regarded as particularly preferred.

Within the context of the present invention, the use of copolymers containing the polyamide component in proportions of 10 to 95% by weight, preferably 50 to 80% by weight, and containing the ethylenic unsaturated component in proportions of 5 to 90% by weight, preferably 20 to 50% by weight, is to be regarded as preferred.

It has proven to be particularly advantageous to use copolymers containing, as the polyamide component, natural polyamides, especially in the form of caseins, gelatines, collagens, bone glues, blood albumins and soy proteins, synthetic polyamides and here in particular polyaspartic acids or copolymers of aspartic and glutamic acid. The invention also includes polyamide components derived from the aforementioned polyamides by way of oxidation, hydrolysis or depolymerisation, for example by enzymatic degradation, as well as any mixtures of the cited representatives.

The use of copolymers having vinyl-containing compounds in their O, S, P and N forms as the ethylenic unsaturated component is also regarded as preferred. Such compounds are selected from the series of vinyl ether, acrylic acid, methacrylic acid, 2-ethylacrylic acid, 2-propylacrylic acid, vinylacetic acid, vinylphosphonic acid, crotonic and isocrotonic acid, maleic acid, fumaric acid, itaconic acid, citraconic acid as well as the amides thereof. However, styrenes are also suitable in general. Particularly preferred are the cited compounds and their equivalents in sulphonated form, as represented, for example, by vinyl-containing sulphonic acids. Particularly preferred in this regard are 2-acrylamido-2-methylpropane sulphonic acid (AMPS), vinyl-sulphonic acid, methallylsulphonic acid and their at least monovalent salts. In specific cases of use, the cited salts may contain one of the series of $Na^+$, $K^+$, $Ca^{2+}$, $Mg^{2+}$, $Zn^{2+}$, $Ba^{2+}$ and/or $Fe^{2+}$ as the cation and a carbonate, sulphate, hydroxide or chloride as the anion.

The use in particular of copolymers produced according to a specific method has proven to be particularly advantageous within the context of the present invention:

Graft polymerisation at temperatures of between −10 and 250° C., in particular between 0 and 100° C., is thereby preferred, which is preferably carried out in each case in the presence of a solvent and in particular in the presence of a polar solvent such as water or dimethylsulphoxide.

However, the invention also takes into consideration the formation of the graft polymers by means of thermal treatment such as, for example, by co-drying the polyamide and the compound to be grafted.

Suitable in particular are copolymers for which water or other polar solvents can be used as the solvent to build their side chains from the individual building blocks ("grafting from"). Polymers having higher molar masses can be obtained if the procedure is carried out anhydrously or if the water is separated by distillation during the reaction.

In addition to the modification of the polyamide in solution, grafting can also take place in bulk. Polymers having a comparatively large molar mass are also obtained with this variant. If the compounds that are to be grafted onto the polyamide are soluble in solvents that are poorly miscible with water, the graft polymers may be formed by way of interfacial condensation: For this purpose, soy protein isolate, for example, is first of all dissolved in an aqueous phase and the compounds to be grafted are dissolved in an organic phase. By vigorously mixing the two phases (for example using a Turax stirrer), polycondensation can take place at the interface between the aqueous and organic phase.

Apart from the options described, the copolymers can also be generated during the thermal co-drying of a solution. In particular water comes into question here as the solvent. The drying process best takes place by spray drying or drum drying.

All grafting reactions should be carried out in a temperature range of between −10° C. and 250° C. If carried out in solution, a temperature range of between 0° C. and 130° C. is preferred. The reactions can be carried out both at normal pressure as well as at an increased pressure.

The present invention includes in particular a use alternative wherein copolymers are used that were produced by functionalising the polyamide component with a double bond. The reaction thereby takes place with a maximum of 10% by weight of an anhydride compound of the maleic acid- or methacrylic acid anhydride-type or an epoxide compound of the glycidyl methacrylate-type and subsequent polymerisation of the ethylenic unsaturated compound at the obtained double bond. It is also possible to use copolymers that have additionally been cross-linked, which can in particular occur with the help of multifunctional ethylenic unsaturated compounds, such as, for example, di- or trimethacrylates.

The present invention finally takes into consideration the use of copolymers having a molar mass $\overline{M}_n$>5 000 g/mol, in particular >10 000 g/mol, preferably >20 000 g/mol and particularly preferred >50 000 g/mol. However, as a whole, the molecular weight of the copolymers used according to the invention is not subject to any restrictions.

Finally, reference is also made to the fact that copolymers which are water-soluble and/or biodegradable are particularly suitable for the claimed use purposes, which can be significant in particular in the oil field domain and in this case especially in typical off-shore applications.

The following examples illustrate the advantages of the present invention.

EXAMPLES

1. Production Examples 1.1

169 g of technical gelatine (Bloom 450) were dissolved in 700 g of water whilst being heated to 70° C. The pH value was adjusted to 8.5 with NaOH. 1.4 g of maleic acid anhydride was then added in portions within 60 minutes. The pH value was thereby kept at 8.5 by simultaneously adding NaOH. Once all of the maleic acid anhydride had been added, further stirring was carried out for 60 minutes at 70° C. The reaction mixture was subsequently allowed to cool to 60° C. and a solution of 60 g of AMPS in aqueous NaOH was added. The pH value was adjusted to 7.6 and rinsing with $N_2$ was carried out for 60 minutes. The reaction was then initiated by adding 0.2 g of $Na_2S_2O_8$ and polymerisation was carried out for a total of 90 minutes at 60° C. A clear increase in viscosity was observed during the reaction.

In a 15% solution, the copolymer obtained in this manner has a viscosity of 2000 cP (measured at 60° C.) and a gel point of 26° C.

1.2

Procedure according to Example 1.1, with 0.4 g of an azo compound (Wako V 50) being used as the initiator.

In a 15% solution, the copolymer obtained in this manner has a viscosity of 112 cP (measured at 60° C.) and a gel point of 29° C.

1.3

Procedure according to Example 1.2, with bone glue being used instead of technical gelatine.

In a 15% solution, the copolymer obtained in this manner has a viscosity of 34 cP (measured at 60° C.) and a gel point of 10° C.

1.4

67 g of bone glue were dissolved in 270 g of water whilst being heated to 70° C. The pH value was adjusted to 8.5 with NaOH. 2.8 g of maleic acid anhydride were then added in portions within 60 minutes. The pH value was thereby kept at 8.5 by simultaneously adding NaOH. Once all of the maleic acid anhydride had been added, further stirring was carried out for 60 minutes at 70° C. The reaction mixture was subsequently allowed to cool to 60° C. and a solution of 50 g of AMPS and 6 g of N,N-dimethylacrylamide (DMAA) in aqueous NaOH was added. The pH value was adjusted to 7.6 and rinsing with $N_2$ was carried out for 60 minutes. The reaction was then initiated by adding 0.8 g of Wako V50 and polymerisation was carried out for a total of 90 minutes at 60° C. A clear increase in viscosity was observed during the reaction.

In a 15% solution, the copolymer obtained in this manner has a Brookfield viscosity of 22 000 cP (measured at 60° C.).

1.5

93 g of bone glue were dissolved in 380 g of water whilst being heated to 70° C. The pH value was adjusted to 8.5 with NaOH. 4.0 g of maleic acid anhydride were then added in portions within 60 minutes. The pH value was thereby kept at 8.5 by simultaneously adding NaOH. Once all of the maleic acid anhydride had been added, further stirring was carried out for 60 minutes at 70° C. The reaction mixture was subsequently allowed to cool to 60° C. and a solution of 64 g of AMPS, 19.6 g of N,N-dimethylacrylamide (DMAA) and 2 g of acrylic acid in aqueous NaOH was added. The pH value was adjusted to 7.6 and rinsing with $N_2$ was carried out for 60 minutes. The reaction was then initiated by adding 1.4 g of tert.-butyl hydroperoxide and polymerisation was carried out for a total of 90 minutes at 60° C. A clear increase in viscosity was observed during the reaction.

In a 15% solution, the copolymer obtained in this manner has a Brookfield viscosity of 137 000 cP (measured at 60° C.).

1.6

36 g of bone glue were dissolved in 130 g of water whilst being heated to 70° C. The pH value was adjusted to 8.5 with 3 g of 20% NaOH. 1.5 g of maleic acid anhydride was then added in portions within 60 minutes. The pH value was thereby kept at 8.5 by simultaneously adding 5 g of 20% NaOH. Once all of the maleic acid anhydride had been added, further stirring was carried out for 120 minutes at 70° C. 23 g of AMPS, 7 g of N,N-dimethylacrylamide (DMAA) and 0.7 g of acrylic acid were subsequently added. Following a waiting time of 15 minutes, the pH value was adjusted to 7.6 with 23 g of 20% NaOH and rinsing with $N_2$ was carried out for 60 minutes. The reaction was then initiated by adding 1.2 g of Wako V50 and polymerisation was carried out for a total of 90 minutes at 70° C. A clear increase in viscosity was observed during the reaction.

In a 15% solution, the copolymer obtained in this manner has a Brookfield viscosity of 160 cP (measured at 60° C.).

1.7

Procedure according to Example 1.6, with 21.8 g of AMPS, 6.6 g of DMAA, 0.7 g of acrylic acid and 1.4 g of vinyl-trimethoxysilane being used as the monomer mixture.

In a 15% solution, the copolymer obtained in this manner has a Brookfield viscosity of 4000 cP (measured at 60° C.) and a gel point of 26° C.

1.8

Procedure according to Example 1.6, with 22.5 g of AMPS, 6.9 g of DMAA and 1.2 g of vinylphosphonic acid being used as the monomer mixture.

In a 15% solution, the copolymer obtained in this manner has a Brookfield viscosity of 150 cP (measured at 60° C.) and a gel point of 23° C.

1.9

Procedure according to Example 1.6, with 22 g of AMPS, 6.7 g of DMAA, 1 g of vinylphosphonic acid and 0.7 g of acrylic acid being used as the monomer mixture.

In a 15% solution, the copolymer obtained in this manner has a Brookfield viscosity of 200 cP (measured at 60° C.) and a gel point of 23° C.

1.10

Procedure according to Example 1.9, with $Ca(OH)_2$ being used instead of NaOH.

In a 15% solution, the copolymer obtained in this manner has a Brookfield viscosity of 190 cP (measured at 60° C.) and a gel point of 23° C.

1.11

Procedure according to Example 1.9, with 0.1 g of methylene-bisacrylamide being added as a cross-linking agent.

In a 15% solution, the copolymer obtained in this manner has a Brookfield viscosity of 4300 cP (measured at 60° C.).

1.12

36 g of bone glue were dissolved in 130 g of water whilst being heated to 70° C. The pH value was adjusted to 8.5 with 3 g of 20% NaOH. 1.5 g of maleic acid anhydride was then added. The pH value was thereby kept at 8.5 by simultaneously adding 5 g of 20% NaOH. Stirring was then carried out for 120 minutes at 70° C. In the next step, 12 g of AMPS, 7 g of N,N-dimethylacrylamide (DMAA), 0.6 g of vinylphosphonic acid and 0.3 g of acrylic acid were added. Following a waiting time of 15 minutes, the pH value was adjusted to 7.6 with 13 g of 20% NaOH and 7.3 g of a 1% aqueous solution of methylenebisacrylamide were added. The reaction was then initiated by adding 1.2 g of Wako V50 and polymerisation was carried out for a total of 90 minutes at 70° C. A clear increase in viscosity was observed during the reaction. The entire reaction was carried out in an inert gas atmosphere ($N_2$).

In a 15% solution, the copolymer obtained in this manner has a Brookfield viscosity of 700 cP (measured at 60° C.) and a gel point of 26° C.

1.13

Procedure according to Example 1.12, with just 8 g of AMPS being used.

In a 15% solution, the copolymer obtained in this manner has a Brookfield viscosity of 19 000 cP (measured at 60° C.) and a gel point of 28° C.

2. Use Examples 2.1

The rheology and fluid loss were determined at 140° F. in the following slurry with 2% bwoc of the respective additive in accordance with the API specification 10A:
700 g class H cement
266 g distilled water
0.5 g tributyl phosphate (anti-foaming agent)

| Additive | T [° F.] | Fann 35 | | | | | | Fluid loss [ml] |
|---|---|---|---|---|---|---|---|---|
| | | 300 | 200 | 100 | 6 | 3 | 600 | |
| Technical gelatine (comparison) | 140 | 122 | 95 | 67 | 40 | 34 | 182 | >1000 "blow out" |
| Ex. 1.1 | 140 | 75 | 49 | 24 | 2 | 2 | 146 | 48 |
| Ex. 1.2 | 140 | 89 | 56 | 29 | 3 | 2 | 160 | 60 |
| Ex. 1.3 | 140 | 76 | 48 | 23 | 3 | 2 | 138 | 32 |

The examples show that according to the invention, the copolymers do not only act as water retention agents, but also significantly improve the flow properties of the slurry.

2.2

The rheology and fluid loss were determined at 190° F. in the following slurry with 1% bwoc of the respective additive in accordance with the API specification 10A:
700 g class H cement
266 g distilled water
0.5 g tributyl phosphate (anti-foaming agent)

| Additive | T [° F.] | Fann 35 | | | | | | Fluid loss [ml] |
|---|---|---|---|---|---|---|---|---|
| | | 300 | 200 | 100 | 6 | 3 | 600 | |
| Ex. 1.9 | 190 | 77 | 51 | 27 | 3 | 2 | 135 | 68 |
| Ex. 1.10 | 190 | 21 | 14 | 7 | 1 | 1 | 40 | 60 |
| Ex. 1.11 | 190 | 117 | 83 | 46 | 5 | 3 | 195 | 58 |
| Ex. 1.12 | 190 | 83 | 58 | 32 | 3 | 2 | 144 | 52 |
| Ex. 1.13 | 190 | 73 | 49 | 26 | 2 | 1 | 126 | 56 |

The examples show that the copolymers according to the invention have a very good action as a fluid loss additive even at high temperatures.

2.3

The copolymer of production example 1.5 was tested as a fluid loss additive in the following drilling fluids in accordance with the guidelines of the API (API Recommended Practice 13B-1, $1^{st}$ Edition, 1990, page 12 et seq.).

| Sea water fluid: | 350 g | bentonite suspension (4 wt-%) |
|---|---|---|
| | 14 g | sea salt according to DIN 50900 |
| | 14 g | copolymer |
| NaCl fluid: | 350 g | bentonite suspension 4 wt-% |
| | 118.1 g | NaCl |
| | 10.5 g | copolymer |

At room temperature and a pressure of 100 psi, a fluid loss of 5.2 ml was found in the sea water fluid and a fluid loss of 3.8 ml in the NaCl fluid.

The example shows that according to the invention, the copolymers also act as a fluid loss additive in drilling fluids.

3. Examination of Biodegradability

The biodegradability of the copolymer of production example 1.8 in sea water was evaluated pursuant to OECD 306 (closed bottle test). After 28 days, 45% of the copolymer had been degraded.

The invention claimed is:

1. A process comprising preparing a composition by admixing a hydraulic binding agent and a polyamide-based copolymer having a polyamide component and at least one grafted side chain formed from an ethylenic unsaturated compound, wherein the ethylenic unsaturated component is a vinyl-containing compound selected from the group consisting of vinyl ether, acrylic acid, methacrylic acid, 2-ethylacrylic acid, 2-propylacrylic acid, vinylacetic acid, vinylphosphonic acid, crotonic acid, isocrotonic acid, maleic acid, fumaric acid, itaconic acid, citraconic acid, an amide thereof and a styrene thereof.

2. The process of claim 1, wherein said polyamide based copolymer is present in an amount sufficient to function as a water-retention agent in the composition.

3. The composition prepared by the process of claim 2.

4. A process for cementing at least one of an oil or gas well, comprising adding the composition of claim 3 into the oil or gas well.

5. The process of claim 1, wherein the copolymer contains from 10 to 95% by weight of the polyamide component and from 5 to 95% by weight of the ethylenic unsaturated compound.

6. The process of claim 1, wherein the polyamide component is selected from the group consisting of a natural polyamide and a synthetic polyamide and degredation products thereof, wherein said degredation products are produced by oxidation, hydrolysis or depolymerization of the polyamide component.

7. The process of claim 1, wherein the polyamide component is selected from the group consisting of a casein, a gelatin, a collagen, a bone glue, blood albumin and soy protein.

8. The process of claim 1, wherein the ethylenic unsaturated component is vinyl ether.

9. The process of claim 1, wherein the vinyl-containing compound is sulfonated.

10. The process of claim 9, wherein the sulfonated vinyl-containing compound is at least one of 2-acrylamido-2-methylpropane sulfonic acid, vinyl sulfonic acid, methallylsulphonic acid or a salt thereof.

11. The process of claim 10, wherein the salt contain one of the series of $Na^+$, $K^+$, $Ca^{2+}$, $Mg^{2+}$, $Zn^{2+}$, $Ba^{2+}$ and/or $Fe^{2+}$ as a cation and a carbonate, sulfate, hydroxide or chloride as an anion.

12. The process of claim 1, wherein the copolymer is produced by direct graft polymerization at a temperature of between −10 and 250° C.

13. The process of claim 12, wherein the copolymer is produced in the presence of a solvent.

14. The process of claim 13, wherein the solvent is polar solvent.

15. The process of claim 14, wherein the polar solvent is water or dimethylsulphoxide.

16. The process of claim 1, wherein the copolymer is produced by functionalizing the polyamide component with a double bond by reaction with a maximum of 10% by weight of an anhydride compound of the maleic acid- or methacrylic acid anhydride-type or an epoxide compound of the glycidyl methacrylate-type, and subsequently polymerizing of the ethylenic unsaturated compound at the obtained double bond.

17. The process of claim 1, wherein the copolymer is cross-linked with a multifunctional ethylenic unsaturated compound.

18. The process of claim 1, wherein the copolymer is crosslinked with at least one of a di- or tri-methacrylate.

19. The process of claim 1, wherein the copolymer has a molar mass $\overline{M}_n > 5,000$ g/mol.

20. The process of claim 1, wherein the copolymer has a molar mass $\overline{M}_n > 50,000$ g/mol.

21. The process of claim 1, wherein the copolymer is water soluble.

22. The process of claim 1, wherein the copolymer is biodegradable.

23. The process of claim 1, further comprising the step of cementing at least one of an oil or gas well by adding the prepared composition into the oil or gas well.

24. The process of claim 23, wherein the oil or gas well is off-shore.

* * * * *